United States Patent [19]

Nikkanen et al.

[11] Patent Number: 5,722,233
[45] Date of Patent: Mar. 3, 1998

[54] TURBOFAN ENGINE EXHAUST MIXING AREA MODIFICATION FOR IMPROVED ENGINE EFFICIENCY AND NOISE REDUCTION

[75] Inventors: John P. Nikkanen, Hartford, Conn.; Thomas J. Jannetta, Tulsa, Okla.

[73] Assignee: The Nordam Group, Inc., Tulsa, Okla.

[21] Appl. No.: 82,050

[22] Filed: Jun. 23, 1993

[51] Int. Cl.⁶ .................................................. F02K 1/38
[52] U.S. Cl. ...................... 60/262; 60/271; 239/265.11; 239/265.17
[58] Field of Search ............ 60/262, 271; 239/265.17, 239/265.11, 265.37

[56] References Cited

U.S. PATENT DOCUMENTS

| | | | |
|---|---|---|---|
| 3,710,890 | 1/1973 | True et al. | 181/33 |
| 4,077,206 | 3/1978 | Ayyagari | 60/262 |
| 4,117,671 | 10/1978 | Neal et al. | 60/262 |
| 4,214,441 | 7/1980 | Monritsen et al. | 60/262 |
| 4,335,573 | 6/1982 | Wright | 60/261 |
| 4,501,393 | 2/1985 | Klees et al. | 239/265 |
| 4,909,346 | 3/1990 | Torkelson | 181/213 |
| 5,060,471 | 10/1991 | Torkelson | 60/262 |
| 5,127,602 | 7/1992 | Batey et al. | 244/1 |
| 5,167,118 | 12/1992 | Torkelson | 60/226 |

FOREIGN PATENT DOCUMENTS

| | | | |
|---|---|---|---|
| 0405796A1 | 6/1989 | European Pat. Off. | F02K 1/08 |
| 7521408 | 6/1976 | France | F02K 3/04 |
| 2062765 | 5/1981 | United Kingdom | F02K 1/46 |

*Primary Examiner*—Charles G. Freay
*Attorney, Agent, or Firm*—Head, Johnson & Kachigian

[57] ABSTRACT

A modified exhaust tailpipe especially for use with an aircraft turbofan engine utilizing a noise suppressor. The modified tailpipe is connected to the exhaust duct of the engine. The forward end of the tailpipe is essentially the same diameter as that of the exhaust duct of the engine. The contour of the tailpipe is such that it increases in diameter to form a bulge to increase the flow area for fan gases in the area of a mixer which is supported within the forward end of the tailpipe exhaust system. This improves the operating efficiency of the jet engine.

2 Claims, 4 Drawing Sheets

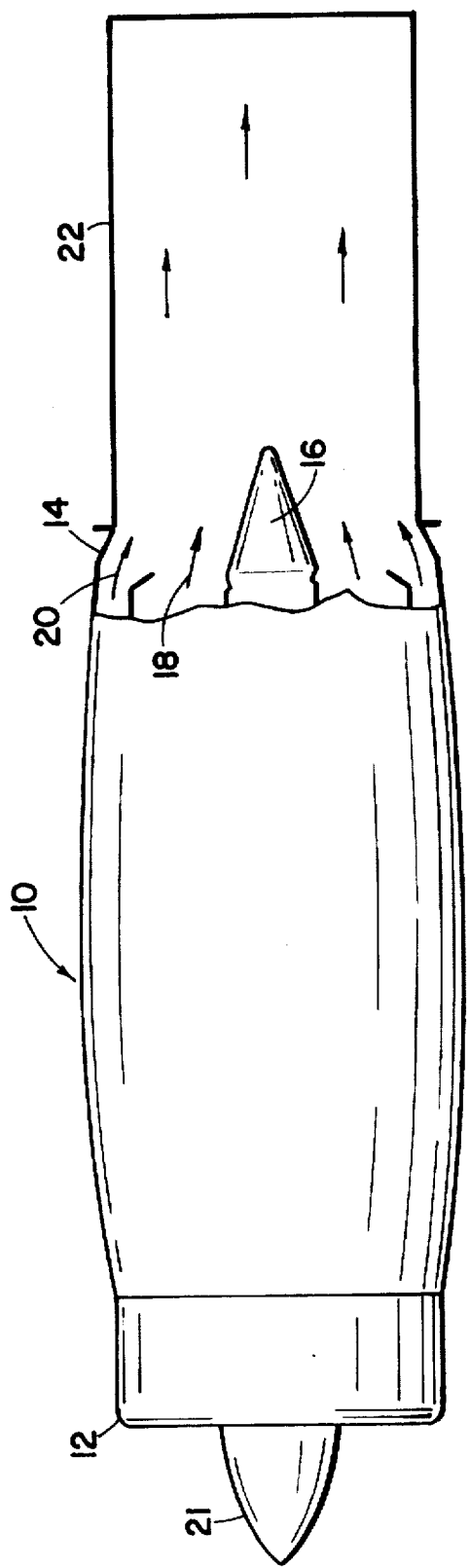
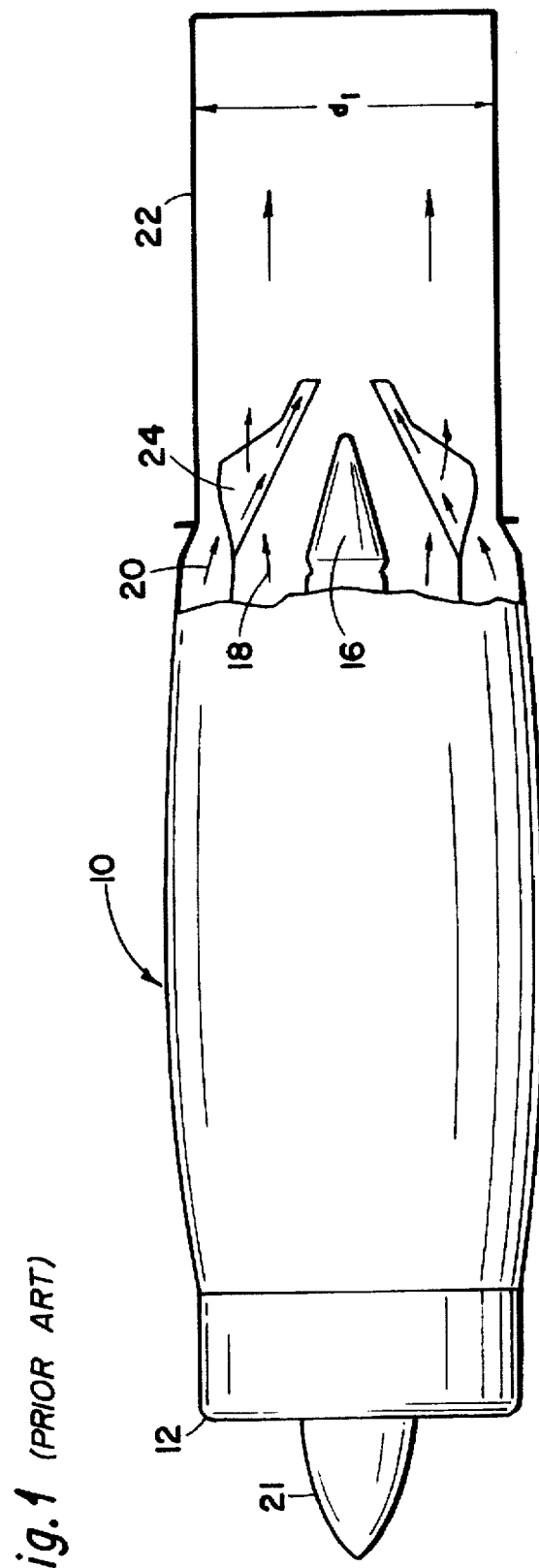
Fig. 1 (PRIOR ART)
Fig. 2 (PRIOR ART)

TURBOFAN ENGINE EXHAUST MIXING AREA MODIFICATION FOR IMPROVED ENGINE EFFICIENCY AND NOISE REDUCTION

BACKGROUND OF THE INVENTION

Noise generated by aircraft jet engines during takeoff and landing is a matter of serious concern in most metropolitan areas of the world. In the United States alone, approximately five million people live or work adjacent to airports and are affected significantly by aircraft noise. Many municipalities have taken action to require reduction in aircraft noise.

Much work has been done on designing turbofan and turbojet aircraft engines to reduce noise levels. For background information relating to noise reduction systems for jet engines, reference may be had to the following U.S. Pat. Nos. 3,710,890; 4,077,206; 4,117,671; 4,501,393; 4,909,346; 5,060,471 and 5,167,118. These patents are incorporated herein by reference.

It generally can be said that in turbofan jet aircraft engines, the engine airflow is split into two parts as it passes through the engine, i.e. the primary or core flow and the fan or bypass flow. The primary or core flow passes through the low pressure and high pressure compressors and into the combustion chamber where fuel is mixed with the high pressure air and burned. The core flow then passes through the high and low pressure turbines and into the exhaust duct. The fan or bypass air flow only passes through the fan (or low pressure compressor) and is routed around the core engine and into the exhaust duct. In low by-pass ratio turbofan engines, the two flows enter the exhaust duct at approximately equal pressure but at much different temperatures (approximately 230° F. for the bypass flow and approximately 1100° F. for the core flow). Unless mixed, the two flows remain substantially separate as they exhaust through the tailpipe of the jet engine. The hot core flow exits the engine at very high velocity which is much greater than the velocity of the fan gas. This hot core gas generates a large part of the engine jet noise.

One apparatus which has been developed and which has achieved beneficial results in the noise reduction of turbofan aircraft engines is the flow mixer, the multi-channel or multi-lobe inverted flow type. Examples of use of such mixers for noise suppression are found in the previously referenced U.S. Pat. Nos. 4,117,671 and 4,077,206. These flow mixers mix the two gas flows to more or less cause all the gas flowing through the tailpipe to flow at the same velocity. These flow mixers have been credited with noise reduction in the range of 3.5 to 4.5 decibels (dB) in the Effective Perceived Noise Level (EPNL), depending upon the engine cycle and bypass ratio. The installation of a mixer in the exhaust duct can cause a reduction in engine efficiency and stability or fan flutter margins by altering the flow split between fan and core air flows and causing engine turbo machinery to operate off its optimized designed point. "Flow split" means the percentage of total engine flow passing through the fan and the core.

SUMMARY OF THE INVENTION

It has been found when using a flow mixer in the exhaust duct, that typically the fan flow area is restricted or reduced by the higher temperature core flow area causing the fan flow to operate at a higher pressure and at a lower flow rate than designed for the engine, thus causing the engine to operate less efficiently and with less desirable fan/low pressure compressor operating lines.

The reduction of engine efficiency (increase in fuel burned at a given thrust level) caused by the installation of an exhaust mixer can be reduced by altering the exhaust tailpipe contour in accordance with this invention to increase the fan flow area and provide a fan/core flow split closer to the engine's optimized designed point. This is accomplished in a preferred embodiment by modifying the tailpipe which is attached to the exhaust duct of a jet engine. For description purposes, the modified tailpipe can be said to have a forward tailpipe exhaust conduit and an aft nozzle. The tailpipe exhaust conduit has a first cylindrical portion with a forward end having diameter "$d_3$" and a second extending portion extending from the cylindrical portion and enlarging at the aft end to form a "bulge" having a maximum diameter "$d_2$" which is greater than "$d_3$". The tailpipe also includes a nozzle connected to the tailpipe exhaust conduit, the nozzle having a first end of diameter "$d_3$" and having a gradually reducing diameter. Within the tailpipe is a mixer assembly having a forward end and an aft end and supported at least partially within said tailpipe exhaust conduit with the aft end preferably terminating at the aft end of the exhaust conduit cylindrical portion. In one design that has been built and successfully tested, "$d_3$" (the diameter of the forward end of the tailpipe exhaust conduit) is 36 inches in diameter (1018 square inches) and "$d_2$" (the maximum diameter of the bulge) is 39 inches in diameter (1194 square inches). Thus, the exhaust conduit contour has been increased to increase the flow area adjacent the mixer to provide a fan/core flow split closer to the engine's optimized design point. The fan flow area which was restricted by the higher temperature core flow, without the modification just described, has now been increased so that the fan can operate at a lower pressure and a higher flow rate than without this improvement.

An object of this invention is to improve the fuel efficiency and fan/low pressure compressor operating lines of a jet engine having noise reduction modifications.

Other objects will become apparent from this following description taken conjunction with the drawings.

DESCRIPTION OF THE DRAWINGS

FIG. 1 is a drawing of a turbofan jet engine with a nose bullet and a tailpipe.

FIG. 2 is similar to FIG. 1 except that an exhaust mixer is shown installed in the tailpipe.

DESCRIPTION OF THE PREFERRED EMBODIMENTS

Figure 3:
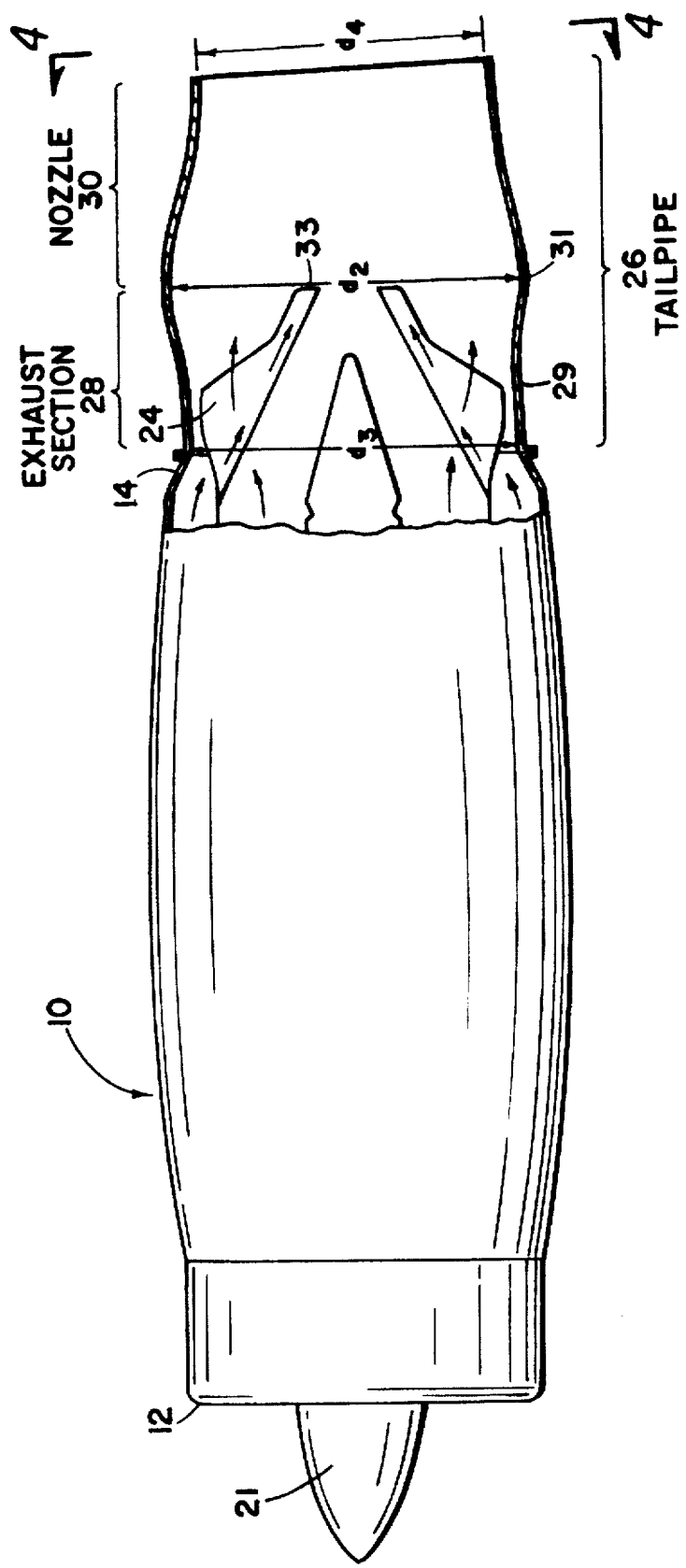
FIG. 3 is a modification of the drawing of FIG. 2 in which the tailpipe has been modified in accordance with this invention.

Referring to FIG. 1, there is shown schematically a low by-pass turbofan jet engine, such as the type presently used on jet airliners. Shown thereon is a jet engine section 10 with a forward end 12 and an aft end 14. A tailpipe 22 connects to aft end 14. The engine core exhaust cone 16 is shown extended into the tailpipe 22 and arrows 18 indicate the flow of core gas and arrows 20 indicate the flow of the fan gas. Nose bullet 21 is also indicated on the forward end of the engine.

Figure 4:
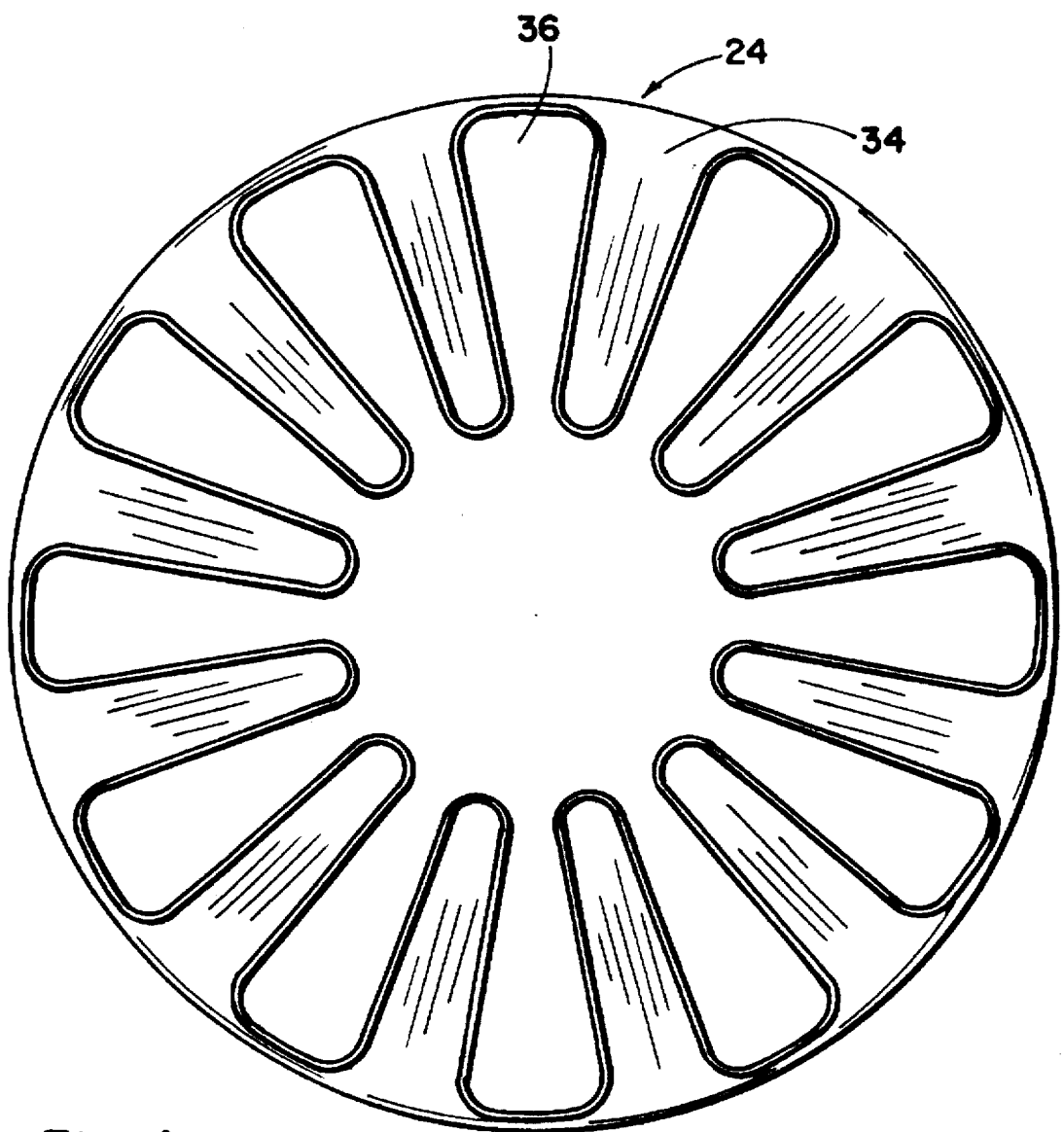
FIG. 4 is an end view of the exhaust mixer with other internal parts omitted for clarity.

FIG. 2 is similar to FIG. 1 except that an exhaust mixer 24 has been added and extends into tailpipe 22. The exhaust mixer shown is a twelve-lobe mixer that can be held in position by attachment brackets, not shown but described in U.S. Pat. No. 4,909,346. Referring to FIG. 4, there is shown an end view of one form of exhaust mixer 24, that is shown to have twelve lobes forming passages for fan flow 34 and core flow 36. The use of such mixing nozzles for suppressing engine noise is well known. Further, referring back to FIG. 2, tailpipe 22 is cylindrical and has a diameter "$d_1$".

In the arrangement of FIG. 1, the primary core flow passes through the high pressure and lower pressure compressors (not illustrated) and into the combustion chamber (not illustrated) where fuel is mixed with the high pressure air and burned. The core flow then passes through the high and low pressure turbines (not illustrated) and then into the exhaust duct. The fan or bypass air flows only through the fan (not illustrated) and is routed around the core engine (not illustrated) and into the exhaust duct. The high core flow exits the engine at a very high velocity, generating a large part of the jet engine noise and thrust. If a cross-section would be taken across the tailpipe, the flow of the core gas would occupy one fairly well defined area at the center and the flow of the cooler fan gas would occupy a second annular area around the outside.

With the addition of the exhaust mixer 24 of FIG. 2, the two streams, i.e. very hot core flow, 1100° F. and the cooler bypass flow 230° F. are mixed to provide a more uniform temperature of the exhaust gases at the exit of the engine exhaust nozzle or tailpipe 22. It can result in a reduction in peak jet velocity and associated jet noise. The installation of the flow mixer in tailpipe 22 can also cause a reduction in engine efficiency and fan/low pressure compressor operating lines by altering the flow split between fan and core air flows and causing the engine turbo machinery to operate off its optimized design point. Typically, available air in the tailpipe for the cooler fan flow is restricted or reduced by the higher temperature core flow causing the fan to operate at higher pressure and lower flow rate than designed for the engine. This lowers engine efficiency and fan/low pressure compressor operating lines.

The reduction in engine efficiency (increased fuel burned at a given thrust level) caused by the installation of an exhaust mixer, such as mixing nozzle 24, can be reduced by use of this invention such as illustrated in FIG. 3. Stated differently, the use of this invention can increase engine efficiency when operating with a flow mixer.

FIG. 3 is similar to FIG. 2 except that tailpipe has been greatly modified and the modified tailpipe is identified by the number 26. As shown in FIG. 3, tailpipe 26 includes a forward tailpipe exhaust conduit section 28 and an aft tailpipe nozzle section 30. The sections 28 and 30 may be made integral. The exhaust conduit section 28 is attached to the engine aft end 14 and has a diameter "$d_3$" which is the same as the diameter "$d_1$" of FIG. 2, which is the diameter of the aft end of the engine 14. Preferably this is a short cylindrical section terminating at point 29. From point 29 to point 31, the exhaust conduit section gradually increases in diameter into a point 31 where it has a diameter "$d_2$". In a preferred embodiment, point 31 is preferably located to correspond to the aft end 33 of mixing nozzle 24. Nozzle 30 then has a generally decreasing diameter to its aft end diameter "$d_4$". The modified tailpipe 26 is thus provided with a "bulge" to increase the flow area for the fan gas. This improvement is obtained with a modified fixed contour and does not depend on moving parts, such as plugs, etc.

Figure 5:
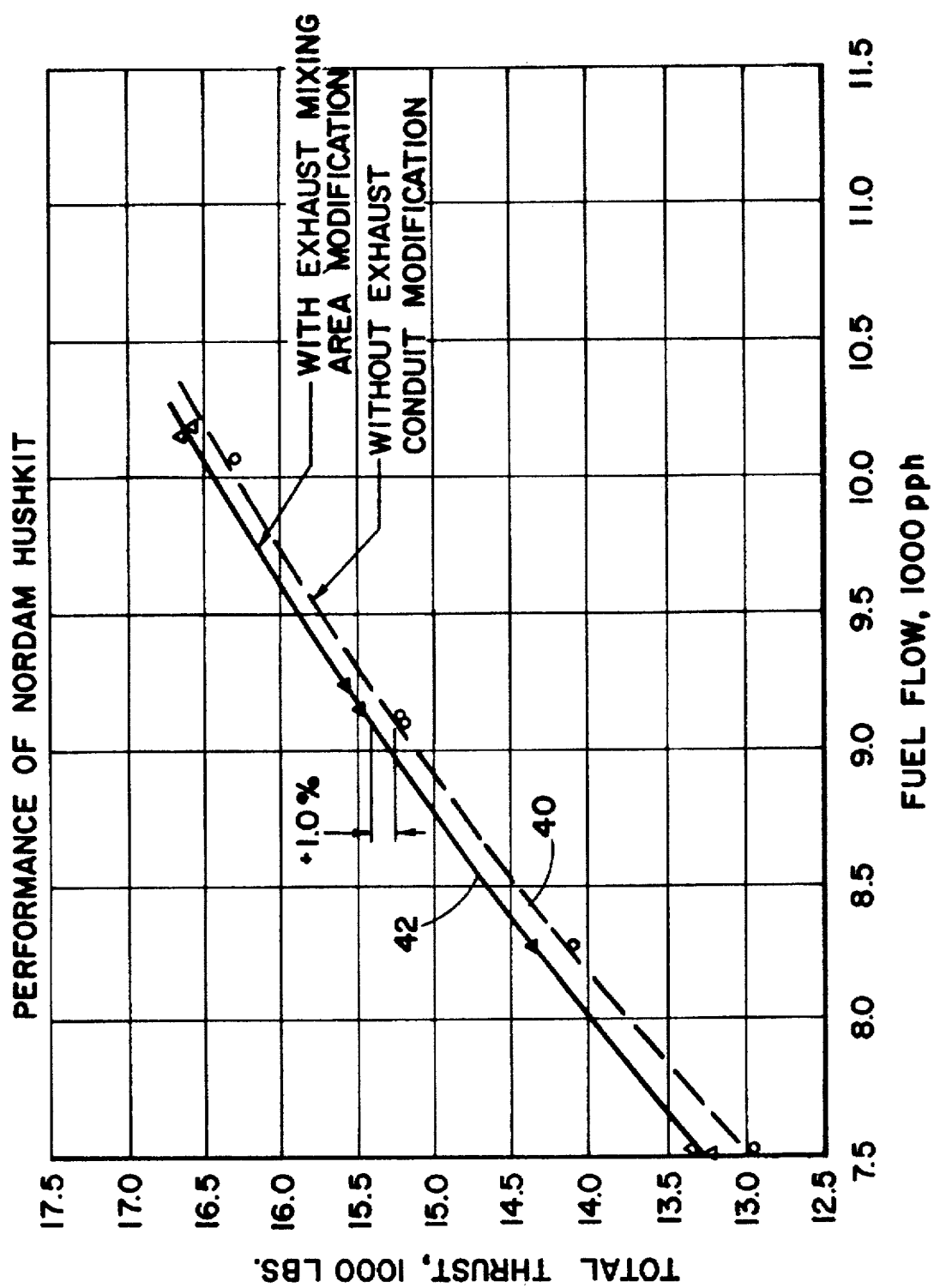
FIG. 5 shows performance curves of a NORDAM Hush Kit with one curve showing the performance with the improvement of this invention and the other without it.

A modified tailpipe, such as shown in FIG. 3, has been built and tested. In that tailpipe, "$d_2$" was 39 inches and "$d_3$" was 36 inches. Thus, the ratio of "$d_2$" to "$d_3$" was about 1.1. In the tailpipe that was tested, the distance from the aft end 14 of the engine to point 31 was approximately 18 inches and the distance from the aft end to point 29, as shown in FIG. 3, was approximately 6 inches. The nozzle 30 from point 31 to the aft end was approximately 45 inches. This modification was tested on an engine test stand and resulted in improvement in engine efficiency in about 1.0%, as shown in FIG. 5. This improved efficiency was caused by altering the exhaust tailpipe contour to increase the flow area of the low temperature fan gas and provide a flow split of the fan gas and core gas closer to the engine optimized design point.

The modifications illustrated in FIG. 3 have been incorporated into a noise reduction modification package (called Hush Kit) developed for the Boeing 737-200 Aircraft and was provided by NORDAM, located at 624 East Fourth Street, Tulsa, Okla. The 737-200 aircraft is a twin engine and is typically operated for 10 hours per day, with six hours of cruise power settings. Assuming the aircraft is operated 250 days per year, this results in 6000 engine hours of cruise operation. At a typical fuel consumption rate of 520 gallons per hour, the aircraft uses approximately 3.1 million gallons of fuel per year. Thus, the one percent fuel savings provided by this modification can save approximately 31,000 gallons of jet fuel per aircraft per year. This is substantial.

Attention is next directed to FIG. 5 that shows the performance test of the NORDAM Hush Kit installed as previously mentioned. The abscissa is Fuel Flow pph (Pounds Per Hour) corrected to standard atmospheric conditions, and the ordinate is Total Thrust in pounds and also corrected to standard atmospheric conditions. There is shown a first curve 40 with the device having features similar to that shown in FIG. 2 including the mixing nozzle 24. Also shown is a curve 42 with a mixing nozzle 24 and also with the improved exhaust conduit modification shown in FIG. 3. This test data clearly shows the improved fuel performance and efficiency of a jet engine using the invention described herein. It is determined that this improvement is slightly greater than one percent. This improvement is considered very significant in the aviation industry.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use with a turbofan engine having an engine exhaust duct through which engine core and fan gases are ejected, an improved fuel efficient and noise suppression tailpipe comprising:

a tailpipe exhaust section having a forward end and an aft end and having a flow area with an internal diameter at said forward end of $d_3$, said forward end being connected to said engine exhaust duct, said tailpipe exhaust section expanding in the direction towards said aft end to an internal diameter of $d_2$;

fixed mixing means for mixing all engine core gas and all fan gas positioned at least partially within said tailpipe exhaust section, all substantial portions of the mixing means being forward of a mixing means aft end at which, a mixed exhaust stream of all of the engine core gas and fan gas is provided; and a tailpipe nozzle section having a forward end and an exhaust end, the tailpipe nozzle section forming a unitary, undivided internal passageway through which all of said mixed exhaust stream passes, the forward end having an internal diameter of $d_2$ and forming a juncture with said tailpipe exhaust section aft end, the nozzle section converging in diameter towards said aft end to an internal diameter of $d_4$, $d_2$ being greater than $d_3$ and $d_4$ so that thereby a noise reducing internal, increased flow area bulge is formed in said tailpipe at said juncture of said exhaust section and said nozzle section, the ratio of $d_2$ to $d_3$ being about 1.1, said mixing means aft end being substantially in alignment with said noise reducing bulge at said exhaust section and said nozzle section juncture so that thereby no substantial portion of any portion of a mixer means extends within said tailpipe nozzle section, said increased flow area bulge serving to suppress noise and increase efficiency of said turbofan engine.

2. A tailpipe system as defined in claim 1 in which said tailpipe exhaust section and said nozzle section are integral.

\* \* \* \* \*

UNITED STATES PATENT AND TRADEMARK OFFICE
CERTIFICATE OF CORRECTION

PATENT NO. : 5,722,233
DATED : March 3, 1998
INVENTOR(S) : John P. Nikkanen et al It is certified that error appears in the above-identified patent and that said Letters Patent is hereby corrected as shown below:

Cover Page, "[73] Assignee:", after "The Nordam Group, Inc., Tulsa, Okla." add --United Technologies Corporation, East Hartford, Conn.--

Signed and Sealed this

Fourteenth Day of September, 1999

Attest:

Q. TODD DICKINSON

*Attesting Officer*   *Acting Commissioner of Patents and Trademarks*